(12) United States Patent
Johnson

(10) Patent No.: US 7,713,500 B2
(45) Date of Patent: May 11, 2010

(54) LEACHING PROCESS

(75) Inventor: Gary Donald Johnson, Western Australia (AU)

(73) Assignee: Western Minerals Technology Pty Ltd., Western Australia (AU)

( * ) Notice: Subject to any disclaimer, the term of this patent is extended or adjusted under 35 U.S.C. 154(b) by 56 days.

(21) Appl. No.: 12/148,600

(22) Filed: Apr. 21, 2008

(65) Prior Publication Data

US 2008/0197545 A1 Aug. 21, 2008

Related U.S. Application Data

(63) Continuation of application No. 10/475,442, filed as application No. PCT/AU02/00584 on May 10, 2002, now Pat. No. 7,374,732.

(30) Foreign Application Priority Data

May 15, 2001 (AU) ................... PR 5031

(51) Int. Cl.
*B01J 8/00* (2006.01)
*B01D 11/00* (2006.01)
*C22B 11/00* (2006.01)

(52) U.S. Cl. .......... 422/234; 422/211; 75/744; 423/27; 423/29; 423/30; 423/31; 423/150.1; 423/150.5

(58) Field of Classification Search ........... 422/211, 422/234; 75/744; 423/29, 30, 31, 27, 150.1, 423/150.5
See application file for complete search history.

(56) References Cited

U.S. PATENT DOCUMENTS

| 3,367,034 | A | * | 2/1968 | Good ................... 34/245 |
| 3,903,239 | A | * | 9/1975 | Berkovich ............. 423/82 |
| 3,929,963 | A | * | 12/1975 | Kurata et al. ........... 423/86 |
| 4,038,361 | A | | 7/1977 | Posel |
| 4,729,881 | A | * | 3/1988 | Copenhafer ........... 423/123 |
| 5,071,477 | A | | 12/1991 | Thomas et al. |
| 5,489,326 | A | | 2/1996 | Thomas et al. |
| 5,785,736 | A | * | 7/1998 | Thomas et al. ......... 75/736 |
| 5,855,858 | A | | 1/1999 | Jones |
| 6,110,255 | A | * | 8/2000 | Williams et al. ........ 75/744 |
| RE37,251 | E | | 7/2001 | Jones |
| 6,451,088 | B1 | * | 9/2002 | Marsden et al. ........ 75/739 |
| 6,482,250 | B1 | * | 11/2002 | Williams et al. ........ 75/744 |

FOREIGN PATENT DOCUMENTS

AU 48867/00 10/2000
CA 2016640 11/1990

OTHER PUBLICATIONS

Derwent Abstract Accession No. 91-037151/06, of CA 2016640 (Amer Barrick Res) Nov. 17, 1990.

* cited by examiner

*Primary Examiner*—Walter D Griffin
*Assistant Examiner*—Huy-Tram Nguyen
(74) *Attorney, Agent, or Firm*—Ladas and Parry LLP

(57) ABSTRACT

A process for the oxidative leaching of sulphide mineral species, the method characterized by the method steps of: leaching a slurry containing the mineral species in one or more reaction vessels; circulating a stream of leach liquor to a flash cooler; flashing the liquor in the flash cooler at a pressure less than atmospheric pressure so as to dissipate heat; and recirculating the liquor to the or each reaction vessel.

4 Claims, 1 Drawing Sheet

LEACHING PROCESS

This application is a continuation of application Ser. No. 10/475,442 filed on Oct. 20, 2003 now U.S. Pat. No. 7,374,732 which is a 371 of International Application AU02/00584 filed on May 10, 2002, which designated the U.S., claims the benefit thereof and incorporates the same by reference.

FIELD OF THE INVENTION

The present invention relates to an improved leaching process.

More particularly, the improved leaching process of the present invention is intended for use in the processing of mineral ores and concentrates containing valuable metal values to be extracted therefrom, at least in part by methods of oxidative hydrometallurgy, and the subsequent recovery thereof.

BACKGROUND ART

At present there are available a wide range of process options in the extraction and recovery of metal values from various mineral species, including sulphide minerals. In particular, methods of oxidative hydrometallurgy are often used, one of these such methods being oxidative leaching processes.

Conventional or traditional oxidative leaching processes typically utilise severe physico-chemical conditions in order to achieve acceptable rates of oxidation and/or final recoveries of metal values. The severe physico-chemical conditions of the conventional technology often involve leaching with temperatures in excess of 150° C. and total pressures in excess of 2000 kPa. These extreme conditions, typified by the so-called Sherritt process, place certain physical requirements upon the reaction vessels or autoclaves, and the oxygen supply requirements. In addition, retention times in the leach are long in order to ensure adequate extraction of the appropriate metal values, often involving retention times of greater than two to two and a half hours.

Some work has been conducted in an effort to provide a method of processing a mineral species which utilises an oxidative leach under what may be termed "relatively mild" conditions of pressure and temperature, relative to conventional oxidative hydrometallurgy technologies. In addition, the leach utilised in these processing methods consumes less oxygen than conventional processes. One obvious advantage of the ability to conduct an oxidative leach under these "mild conditions" is the substantial avoidance of the cost required to provide autoclaves built to withstand conditions of high pressure and temperature. Australian Patent Applications 27182/92 and 48867/00 describe methods for the processing of mineral species utilising an oxidative leach under mild conditions of temperature and pressure. These mild conditions are described as temperatures of less than about 120° C. and oxygen pressures of less than about 1000 kPa. The content of both these prior patent applications is incorporated herein by reference.

The reactions involved in the oxidative leaching of sulphide minerals are typically exothermic, thereby generating heat which is required to be dissipated in some manner if the advantages of running the oxidative leach at mild conditions are to be realised. The methods described in Applications 27182/92 and 48867/00 utilise, in pilot plant form, a number of autoclaves arranged in series, in which slurry passes from one autoclave to the next, at the end of which the slurry, if it is at this point above 100° C., may be flashed to effect a level of cooling. The primary cooling is achieved by injection of a cooling liquid into each autoclave as required to achieve the necessary cooling.

The above processing options progressively dilute the slurry during oxidative leaching and require energy be consumed in pumping of the cooling liquid.

In addition to typical flashing methods, in which slurry is discharged to a flash tank at the end of the autoclave train, conventional methods may also utilise jacketed autoclaves about which cooling liquid is circulated, and/or the use of other forms of heat exchange, including the use of common heat sinks.

Heat exchange surfaces can typically foul, requiring cost and time intensive maintenance. The large extent of the heat transfer surfaces required often makes their use impractical.

The design utilised above does not readily lend itself to up-scaling to commercial plants, largely as a result of each of the inefficiencies noted above in relation to the cooling methods employed. One available solution is to run the oxidative leach at a higher temperature, for example 150° C. This would allow a reduction in the size of the reaction vessels in any commercial plant. However, this does not avoid the typical problems of the prior art processes utilising temperatures greater than 120° C., which is preferably to be avoided. In addition, the decrease in size of the reaction vessels obtained through an increase in the reaction temperature from 100° C. to 150° C. is typically only as great as 40%. It is envisaged by the Applicant that greater efficiencies can be obtained through utilising the process of the present invention.

The improved leaching process of the present invention has as one object thereof to substantially overcome, or at least provide a useful alternative to, the processes of the prior art described hereinabove.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided an improved leaching process comprising the oxidative hydrometallurgical treatment of a slurry containing one or more mineral species in at least one reaction vessel, the process characterised by the slurry from at least one of the or each reaction vessels being circulated through one or more flash coolers arranged in parallel therewith to dissipate heat therefrom, the or each flash cooler being operated at a pressure less than atmospheric pressure (a negative pressure or vacuum).

Preferably, the negative pressure or vacuum of the or each flash cooler is provided by way of condensation of gases from the flash cooler in a condenser.

In one form of the invention there is provided a process for the oxidative leaching of sulphide mineral species, the method characterised by the method steps of:

leaching a slurry containing the mineral species in one or more reaction vessels;

circulating a stream of leach liquor from at least one of the reaction vessels to a flash cooler;

flashing the liquor in the flash cooler at a pressure less than atmospheric pressure so as to dissipate heat; and recirculating the liquor to the or each reaction vessel.

Preferably, the reaction vessels are operated at a temperature of less than about 120° C. and at a pressure of less than about 1000 kPa. The conditions within the or each flash cooler are preferably about 80° C. and 50 kPa.

Still preferably, the reaction vessel temperature is between about 105 and 110° C. and the flash cooler temperature about 82° C. The reaction vessel pressure is preferably about 900 kPa.

In accordance with the present invention there is further provided an apparatus for the oxidative leaching of an ore or concentrate, the apparatus characterised by one or more reaction vessels arranged in parallel with one or more flash coolers to facilitate recirculation of leach liquor therebetween, and the dissipation of heat therefrom, the or each flash cooler being arranged to communicate with at least one condenser to which gases pass from one or more of the reaction vessels and condense, thereby creating a negative pressure or vacuum in the or each flash cooler.

BRIEF DESCRIPTION OF THE DRAWINGS

The improved leaching process of the present invention will now be described, by way of example only, with reference to one embodiment thereof and the accompanying drawings, in which.

BEST MODE(S) FOR CARRYING OUT THE INVENTION

Figure 1:
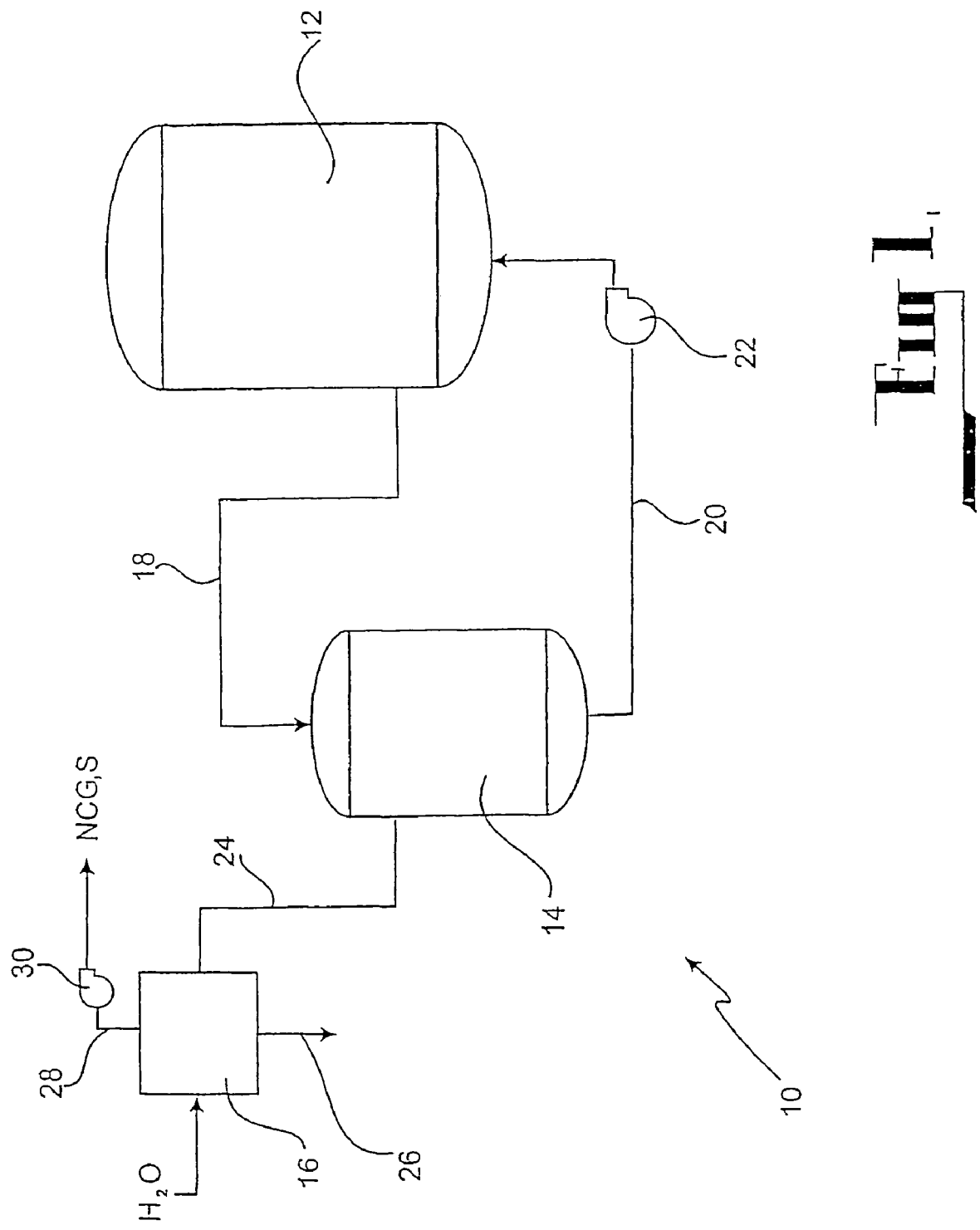
FIG. 1 is a schematic representation of an improved leaching process in accordance with the present invention.

In FIG. 1 there is shown a diagrammatic representation of a portion of an apparatus 10 used to implement the improved leaching process of the present invention. The apparatus 10 comprises at least one leaching vessel or reactor, for example an autoclave 12 equipped with an agitator (not shown), a flash cooler 14 and a condenser 16. The autoclave 12 is provided with an outlet line 18 extending to, and communicating with, the flash cooler 14. The autoclave 12 and flash cooler 14 have a further recirculation line 20 provided therebetween. A pump 22 is provided in-line in the recirculation line 20.

The flash cooler 14 is provided with an outlet line 24 communicating directly with the condenser 16. The condenser 16 has both a condensed liquid outlet 26 and a non-condensable gases (NCG's) outlet 28. The NCG outlet 28 has a vacuum pump 30 provided in-line therein.

In use, slurry is pumped to the autoclave 12, in which the slurry is subjected to increased conditions of temperature and pressure, in substantially known manner. Leach liquor is withdrawn from the autoclave 12 through outlet line 18 and passed to the flash cooler 14, in which it is subjected to a vacuum contributing to heat dissipation. Liquor from the flash cooler 14 is recirculated therefrom to the autoclave 12 through recirculation line 20.

Gases from the flash cooler 14 pass to the condenser 16 through the outlet line 24 and are condensed. The condensed liquid leaves the condenser 16 via the outlet 26. NCG's exit the condenser 16 via the outlet 28. The condensing of the gases in the condenser 16 creates the vacuum utilised in the flash cooler 14.

The particular arrangement of the apparatus 10 described above allows increased levels of process control with regard to heat dissipation. The autoclave 12 contents can be flashed as often as required in the flash cooler 14.

The process of the present invention will now be described with reference to one example thereof. It is to be understood that specific conditions of the example are not limiting and are simply exemplary of appropriate process conditions in accordance with the present invention.

EXAMPLE

The single autoclave 12 is replaced with a series of four autoclaves arranged in series and providing an operating volume of about 127 L. The first autoclave is fed a slurry of sulphide concentrate at a ambient temperature, about 30% solids, and at a rate of about 60 L/h. The conditions within the autoclaves are preferably between about 105 and 110° C. and a pressure of below about 1000 kPa, for example 900 kPa. These conditions are typically "mild" conditions of temperature and pressure as characterise the process described in Australian Patent Applications 27182/92 and 48867/00. The residence time of slurry within the series of autoclaves is less than about 2 hours, for example 1.7 to 1.9 hours, with a throughput of about 25 kg/h.

Conditions within the flash cooler 14 are preferably approximately 82° C. and a pressure vacuum of 50 kPa. As indicated previously, the vacuum or negative pressure within the flash cooler 14 dictates the dissipation of heat from the liquor transferred thereto. The rate of liquor circulation from the first in the series of autoclaves through the flash cooler 14 dictates the amount of heat dissipated, being for example approximately 300 L/h.

Oxygen is fed to each of the autoclaves making up the series at a total flow rate of between about 69 and 208 L/min at a purity of 92%. This assumes a 60% utilisation of oxygen.

The applicant has been able to achieve overall decreases in size of 65 to 70% with respect to the leach method and apparatus described in Australian Patent Applications 27182/92 and 48867/00, utilising a circulation rate of 6 autoclave volumes per hour through the flash cooler.

It is envisaged that the process and apparatus of the present invention will provide sulphide oxidation and metal extraction levels, for example of nickel, copper and cobalt, that compete favourably and are comparable with prior art methods and apparatus.

The improved leaching process of the present invention provides significant advantages, including a decrease in general downstream processing requirements. This decrease in processing requirements downstream of the improved leaching process of the present invention is a direct result of an increase in the percentage solids in the slurry passing to down stream processing, and a decrease in the size of any reaction vessels required. The percentage solids is maintained at a comparatively high level with respect to known processes which utilise the injection of a cooling liquor into the or each autoclave to control the temperature therein, and which thereby dilute the leach liquor.

The improved leaching process of the present invention is considered to be particularly sustainable compared with conventional technologies, as a direct result of the method of heat dissipation employed. For example, there are no heat exchange surfaces to foul, whilst any fouling of the surface of the flash cooler 14 is largely inconsequential to its operation.

The use of the improved leach process of the present invention allows the use of relatively small autoclave vessels when compared with vessel sizes used in conventional technologies, thereby decreasing capital costs.

It is envisaged that not all the autoclaves in a series of autoclaves need to utilise a flash cooler. Some autoclaves may utilise more conventional cooling methods and still provide a benefit to the overall process and apparatus.

Modification and variations such as would be apparent to the skilled addressee are considered to fall within the scope of the present invention.

The invention claimed is:

1. An apparatus for the oxidative leaching of an ore or concentrate, the apparatus comprising at least one reaction vessel and at least one flash cooler, said at least one reaction vessel and at least one flash cooler being arranged to facilitate recirculation of leach liquor therebetween, and the dissipation of heat therefrom, the at least one flash cooler being arranged to communicate with at least one condenser to which gases pass from the at least one reaction vessel and condense, thereby creating a negative pressure or vacuum in the at least one flash cooler, the apparatus further comprising means for passing leach liquor from the at least one reaction vessel directly to the at least one flash cooler and for recirculating the leach liquor from the at least one flash cooler directly to the at least one reaction vessel so that heat is dissipated from the leach liquor without introduction of liquid that would dilute the leach liquor.

2. The apparatus according to claim 1, comprising a plurality of reaction vessels, including the at least one reaction vessel, said plurality of reaction vessels being arranged in series.

3. The apparatus according to claim 1, comprising a plurality of reaction vessels, including the at least one reaction vessel, and a plurality of flash coolers, including the at least one flash cooler, wherein the plurality of reaction vessels are arranged in series and each of the plurality of reaction vessels is arranged to communicate with a respective one of the plurality of flash coolers so as to facilitate recirculation of leach liquor between the plurality of reaction vessels and the plurality of flash coolers.

4. An apparatus for the oxidative leaching of an ore or concentrate, the apparatus comprising a plurality of reaction vessels arranged in series and a plurality of flash coolers each of which is arranged to communicate with a respective one of the plurality of reaction vessels so as to facilitate recirculation of leach liquor between the plurality of reaction vessels and the plurality of flash coolers and the dissipation of heat from the leach liquor, each of the plurality of flash coolers being arranged to communicate with a condenser to which gases pass from the plurality of reaction vessels and condense, thereby creating a negative pressure or vacuum in each of the plurality of flash coolers, and means for passing leach liquor directly from the reaction vessels to the flash coolers and for recirculating the leach liquor directly from the flash coolers to the reaction vessels so that heat is dissipated from the leach liquor without introduction of liquid that would dilute the leach liquor.

* * * * *